(12) United States Patent
Querel et al.

(10) Patent No.: US 8,999,026 B2
(45) Date of Patent: Apr. 7, 2015

(54) BONDED ABRASIVE ARTICLE AND METHOD OF FORMING

(71) Applicants: Saint-Gobain Abrasives, Inc., Worcester, MA (US); Saint-Gobain Abrasifs, Conflans-Sainte-Honorine (FR)

(72) Inventors: Gilles Querel, Woluwe Saint-Iambert (BE); Sandhya Jayaraman Rukmani, Worcester, MA (US); Muthu Jeevanantham, Shrewsbury, MA (US); Rosemarie Bot-Schulz, Gerolzhofen (DE); Kelley McNeal, Marlborough, MA (US); Nilanjan Sarangi, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

(21) Appl. No.: 14/080,556

(22) Filed: Nov. 14, 2013

(65) Prior Publication Data
US 2014/0069021 A1 Mar. 13, 2014

Related U.S. Application Data

(63) Continuation of application No. 12/901,218, filed on Oct. 8, 2010, now Pat. No. 8,617,273.

(60) Provisional application No. 61/249,659, filed on Oct. 8, 2009.

(51) Int. Cl.
*B24D 3/14* (2006.01)
*C09K 3/14* (2006.01)
*B24D 18/00* (2006.01)

(52) U.S. Cl.
CPC ............... *B24D 3/14* (2013.01); *C09K 3/1454* (2013.01); *B24D 18/0054* (2013.01)

(58) Field of Classification Search
CPC ............. B24D 3/04; B24D 3/14; B24D 3/16; B24D 3/18
See application file for complete search history.

(56) References Cited

U.S. PATENT DOCUMENTS

| 4,314,827 A | 2/1982 | Leitheiser et al. |
| 4,543,107 A | 9/1985 | Rue |

(Continued)

FOREIGN PATENT DOCUMENTS

| CN | 1420100 A | 5/2003 |
| CN | 1509843 A | 7/2004 |

(Continued)

OTHER PUBLICATIONS

PCT Application No. PCT/US2010/058783, filed Dec. 2, 2010 "Notification of Transmittal of the International Search Report and The Written Opinion of the International Searching Authority, or the Declaration", dated Aug. 19, 2011, 10 pages.

(Continued)

*Primary Examiner* — Pegah Parvini
(74) *Attorney, Agent, or Firm* — Abel Law Group, LLP; Joseph P. Sullivan (57) ABSTRACT

An abrasive article having an abrasive body including abrasive grains contained within a bond material, wherein the abrasive grains comprise microcrystalline alumina, and wherein the bond material includes less than about 1.0 mol % phosphorous oxide ($P_2O_5$), and a ratio measured in mol % between a total content of sodium oxide ($Na_2O$) and a total content of potassium oxide ($K_2O$) defined by [$K_2O/Na_2O$] having a value greater than about 0.5.

19 Claims, 2 Drawing Sheets

(56) References Cited

U.S. PATENT DOCUMENTS

| | | | |
|---|---|---|---|
| 4,623,364 A | 11/1986 | Cottringer et al. | |
| 4,744,802 A | 5/1988 | Schwabel | |
| 4,898,597 A | 2/1990 | Hay et al. | |
| 4,944,773 A | 7/1990 | Rue et al. | |
| 4,997,461 A | 3/1991 | Markhoff-Matheny et al. | |
| 5,037,452 A | 8/1991 | Gary et al. | |
| 5,090,970 A | 2/1992 | Rue et al. | |
| 5,131,923 A | 7/1992 | Markhoff-Matheny et al. | |
| 5,152,810 A | 10/1992 | Rue et al. | |
| 5,203,886 A | 4/1993 | Sheldon et al. | |
| 5,244,477 A | 9/1993 | Rue et al. | |
| 5,401,284 A | 3/1995 | Sheldon et al. | |
| 5,536,283 A | 7/1996 | Sheldon et al. | |
| 5,672,185 A | 9/1997 | Ryoke | |
| 5,863,308 A | 1/1999 | Qi et al. | |
| 5,975,988 A | 11/1999 | Christianson | |
| 6,066,189 A | 5/2000 | Meyer et al. | |
| 6,086,648 A | 7/2000 | Rossetti, Jr. et al. | |
| 6,287,353 B1 | 9/2001 | Celikkaya | |
| 6,500,220 B1 | 12/2002 | Krueger et al. | |
| 6,592,640 B1 | 7/2003 | Rosenflanz et al. | |
| 6,702,867 B2 | 3/2004 | Carman et al. | |
| 2003/0045221 A1 | 3/2003 | Li et al. | |
| 2003/0194947 A1 | 10/2003 | Bright et al. | |
| 2003/0236062 A1 | 12/2003 | Li et al. | |
| 2005/0183407 A1 | 8/2005 | Hayward et al. | |
| 2006/0196123 A1 | 9/2006 | Marlin | |
| 2008/0222967 A1 | 9/2008 | Querel et al. | |
| 2009/0324919 A1* | 12/2009 | Lang et al. | 428/220 |
| 2011/0083374 A1 | 4/2011 | Querel et al. | |
| 2011/0131888 A1 | 6/2011 | Querel et al. | |
| 2011/0131889 A1 | 6/2011 | Querel et al. | |

FOREIGN PATENT DOCUMENTS

| | | |
|---|---|---|
| DE | 3346772 A1 | 9/1985 |
| EP | 0152768 A2 | 8/1985 |
| JP | S49-4285 A | 1/1974 |
| JP | 60151247 A | 8/1985 |
| JP | H03-205475 A | 9/1991 |
| JP | H01563060 A | 6/1993 |
| JP | H06-86326 B2 | 11/1994 |
| JP | H06-335866 A | 12/1994 |
| JP | H07-16882 B2 | 3/1995 |
| JP | H08-39434 A | 2/1996 |
| JP | H08-505175 A | 6/1996 |
| JP | 2001-260032 A | 9/2001 |
| JP | 2002522636 A | 7/2002 |
| JP | 2003-521577 A | 7/2003 |
| JP | 2006-247837 A | 9/2006 |
| JP | 2007-231287 A | 9/2007 |
| JP | 2000-280175 A | 10/2010 |
| JP | 2013-507260 A | 3/2013 |
| JP | 2013-512114 A | 4/2013 |
| JP | 2013-512115 A | 4/2013 |
| SU | 361158 A1 | 12/1972 |
| SU | 1177326 A | 9/1985 |
| WO | 94/14722 A1 | 7/1994 |
| WO | 00/08219 A1 | 2/2000 |
| WO | 00/35632 A2 | 6/2000 |
| WO | 01/14495 A1 | 3/2001 |
| WO | 2008079680 A1 | 7/2008 |

OTHER PUBLICATIONS

PCT Application No. PCT/US2010/052051, filed Oct. 8, 2010 "Notification of Transmittal of the International Search Report and The Written Opinion of the International Searching Authority, or the Declaration", dated Jun. 3, 2011, 10 pages.

PCT Application No. PCT/US2010/058782, filed Dec. 2, 2010 "Notification of Transmittal of the International Search Report and The Written Opinion of the International Searching Authority, or the Declaration", dated Aug. 17, 2011, 10 pages.

U.S. Appl. No. 12/959,273, filed Dec. 2, 2010, Inventors: Gilles Querel et al.

U.S. Appl. No. 12/959,282, filed Dec. 2, 2010, Inventors: Gilles Querel et al.

* cited by examiner

BONDED ABRASIVE ARTICLE AND METHOD OF FORMING

CROSS-REFERENCE TO RELATED APPLICATION

This application claims priority under 35 U.S.C. §120 to and is a continuation of U.S. application Ser. No. 12/901,218 entitled "Bonded Abrasive Article and Method of Forming," by Querel et al., filed Oct. 8, 2010, which in turn claims priority under 35 U.S.C. §119(e) to U.S. Patent Application No. 61/249,659 entitled "Bonded Abrasive Article and Method of Forming," by Querel et al., filed Oct. 8, 2009, both of which are assigned to the current assignee hereof and incorporated herein by reference in their entireties.

BACKGROUND

1. Field of the Disclosure

The following is directed to bonded abrasives and particularly bonded abrasive articles incorporating microcrystalline alumina abrasive grains

2. Description of the Related Art

Abrasive tools are generally formed to have abrasive grains contained within a bond material for material removal applications. Superabrasive grains (e.g., diamond or cubic boron nitride (CBN)) or seeded (or even unseeded) sintered sol gel alumina abrasive grain, also referred to microcrystalline alpha-alumina (MCA) abrasive grain, can be employed in such abrasive tools and are known to provide superior grinding performance on a variety of materials. The bond material can be organic materials, such as a resin, or an inorganic material, such as a glass or vitrified material. In particular, bonded abrasive tools using a vitrified bond material and containing MCA grains or superabrasive grain are commercially useful for grinding precision metal parts and other industrial components requiring consistent and improved grinding performance.

Certain bonded abrasive tools, particularly those utilizing a vitrified bond material, require high temperature forming processes, oftentimes on the order of 1000° C. or greater, which can have deleterious effects on the abrasive grains. In fact, it has been recognized that at such elevated temperatures necessary to form the abrasive tool, the bond material can react with the abrasive grains, particularly MCA grains, and damage the integrity and reducing the grain sharpness and performance properties. As a result, the industry has migrated toward reducing the formation temperatures necessary to form the bond material in order to curb the high temperature degradation of the abrasive grains during the forming process.

For example, to reduce the amount of reaction between MCA grain and vitrified bond, U.S. Pat. No. 4,543,107 discloses a bond composition suitable for firing at a temperature as low as about 900° C. In an alternate approach, U.S. Pat. No. 4,898,597 discloses a bond composition comprising at least 40% fritted materials suitable for firing at a temperature as low as about 900° C. Other such bonded abrasive articles utilizing bond materials capable of forming at temperatures below 1100° C., and in fact, below 1000° C., include U.S. Pat. No. 5,203,886, U.S. Pat. No. 5,401,284, U.S. Pat. No. 5,536,283, and U.S. Pat. No. 6,702,867. Still, the industry continues to demand improved performance of such bonded abrasive articles.

SUMMARY

According to one aspect an abrasive article includes an abrasive body having abrasive grains contained within a bond material, wherein the abrasive grains comprise microcrystalline alumina, and wherein the bond material comprises less than about 1.0 mol % phosphorous oxide ($P_2O_5$). The bond material can have a ratio measured in mol % between a total content of sodium oxide ($Na_2O$) and a total content of potassium oxide ($K_2O$) defined by [$K_2O/Na_2O$] having a value greater than about 0.5.

In another aspect, an abrasive article includes an abrasive body having a porosity of less than about 50 vol % and abrasive grains contained within a bond material, wherein the abrasive grains include microcrystalline alumina, and wherein the bond material comprises a total content of alkali oxides less than about 12 mol % and less than about 2.0 mol % lithium oxide ($Li_2O$).

In accordance with yet another aspect, an abrasive article includes an abrasive body having abrasive grains contained within a bond material, wherein the abrasive grains comprise microcrystalline alumina, and wherein the bond material comprises less than about 2.0 mol % lithium oxide ($Li_2O$), and less than about 10 mol % boron oxide ($B_2O_3$).

In still another aspect, an abrasive article includes an abrasive body having abrasive grains contained within a bond material, wherein the abrasive grains comprise microcrystalline alumina, and wherein the bond material comprises a total content of alkali oxides less than about 12 mol %. The abrasive article exhibits a sandblast penetration into the abrasive body of not greater than about 2.2 mm as measured under the conditions measured in a sandblast chamber having a volume of 48 cc using standard sand under a pressure of 15 psi for about a single cycle time of 10 seconds.

Another aspect includes an abrasive article comprising an abrasive body including abrasive grains contained within a bond material, wherein the abrasive grains comprise microcrystalline alumina, and wherein the bond material comprises less than about 10 mol % boron oxide ($B_2O_3$). The abrasive body further exhibits a sandblast penetration into the abrasive body of not greater than about 2.2 mm as measured under the conditions measured in a sandblast chamber having a volume of 48 cc using standard sand under a pressure of 15 psi for about a single cycle time of 10 seconds.

According to one aspect, a method of forming an abrasive article includes mixing abrasive grains comprising microcrystalline alumina with a bond material powder, wherein the bond material powder comprises not greater than about 15 wt % alkali oxide compounds, and forming the mixture into a green article. The method further includes heating the green article to a firing temperature of at least about 1100° C. to form an abrasive article having abrasive grains contained within a vitreous bond material.

According to a particular aspect, an abrasive article includes an abrasive body having a porosity of less than about 50 vol % and abrasive grains contained within a bond material, wherein the abrasive grains comprise microcrystalline alumina. The bond material comprises a total content of alkali oxides less than about 13 mol % and less than about 2.0 mol % lithium oxide ($Li_2O$). More particularly, the bond material can contain less than about 12.8 mol %, or less than about 12.6 mol %, or even less than about 12.4 mol % alkali oxides for the total amount of mols within the bond material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is generally directed to an abrasive article, particularly a bonded abrasive article utilizing abrasive grains contained within a bond material. Such abrasive articles are useful in material removal applications, such as those in various industries for finishing and/or grinding workpieces. The abrasive articles can be shaped and sized to make various finishing tools, such as wheels, cones, cup-shaped articles, hones, and/or stones.

Figure 1:
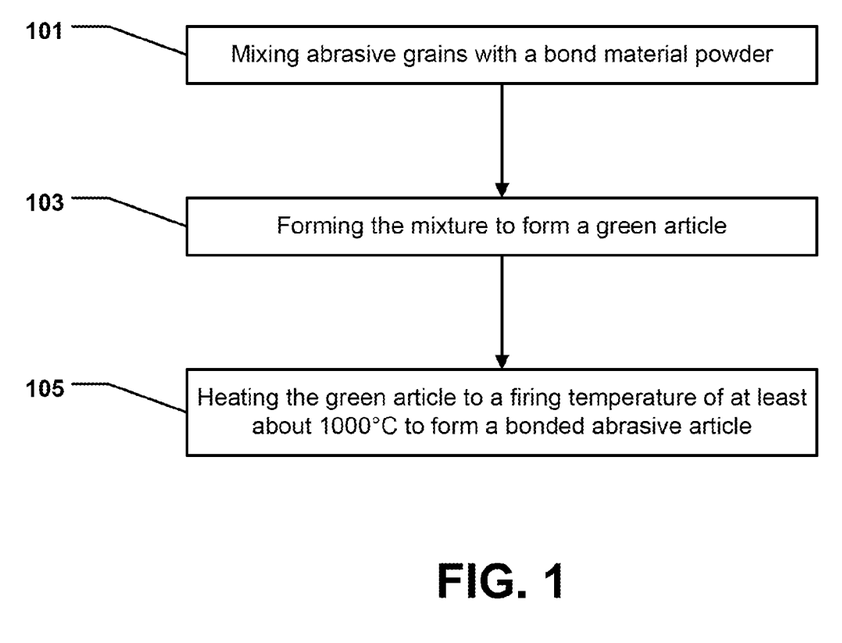
FIG. 1 includes a flow chart illustrating a method of forming an abrasive article in accordance with an embodiment.

FIG. 1 includes a flow chart illustrating a method of forming an abrasive article in accordance with an embodiment. As illustrated, the process is initiated at step 101 by mixing abrasive grains with a bond material powder. In accordance with an embodiment, the abrasive grains can include an inorganic material, such as an oxide. More particularly, the abrasive grains can include microcrystalline alumina (MCA) grains.

The MCA or sol-gel alumina grains are preferably produced by either a seeded or an unseeded sol gel process. As used herein, the term "sol-gel alumina grits" are alumina grits made by a process comprising peptizing a sol of an aluminum oxide monohydrate so as to form a gel, drying and firing the gel to sinter it, and then breaking, screening and sizing the sintered gel to form polycrystalline grains made of alpha alumina microcrystals (e.g., at least about 95% alumina). In addition to the alpha alumina microcrystals, the initial sol may further include up to 15% by weight of spinel, mullite, manganese dioxide, titania, magnesia, rare earth metal oxides, zirconia powder or a zirconia precursor (which can be added in larger amounts, e.g. 40 wt % or more), or other compatible additives or precursors thereof. These additives are often included to modify such properties as fracture toughness, hardness, friability, fracture mechanics, or drying behavior. Preparation of sintered sol gel alpha-alumina grains is described in detail elsewhere. Details of such preparations may be found, for example, in U.S. Pat. Nos. 4,623,364, 4,314,827, and 5,863,308, the contents of which are hereby incorporated by reference.

The term MCA grain is defined to include any grain comprising at least 60% alpha alumina microcrystals having at least 95% theoretical density and a Vickers hardness (500 grams) of at least 18 GPa at 500 grams. The sintered sol gel alpha-alumina grain may contain platelets of material other than alpha-alumina dispersed among the alpha-alumina microcrystals. Generally, the alpha-alumina particles and the platelets are submicron in size when made in this form. Further details of MCA abrasive grain preparations and MCA abrasive grain types useful in the present invention may be found in any one of the numerous other patents and publications which cite the basic technology disclosed in the U.S. Pat. Nos. 4,623,364 and 4,314,827.

The microcrystalline alumina utilized in the abrasive grains can have an average crystallite size of less than 1 micron. In fact, in certain instances, the microcrystalline alumina can have an average crystallite size of less than about 0.5 microns, and particularly within a range between about 0.1 and about 0.2 microns.

Additionally, it will be appreciated that the bonded abrasive articles of embodiments herein may utilize a certain content of secondary abrasive grains. When secondary abrasive grains are used, such abrasive grains can provide from about 0.1 to about 97 vol % of the total abrasive grain of the tool, and more preferably, from about 30 to about 70 vol %. The secondary abrasive grains which may be used include, but are not limited to, alumina oxide, silicon carbide, cubic boron nitride, diamond, flint and garnet grains, and combinations thereof.

In reference to the bond material powder, inorganic materials may be utilized, and in particular, inorganic materials that facilitate the formation of a final-formed abrasive article having a vitreous bond. That is, the final-formed bonded abrasive article can have a vitreous bond having a certain content of amorphous phase. In particular, the final-formed bonded abrasive article of embodiments herein can have a bond material that consists essentially of an amorphous phase.

In particular instances, the bond material powder can include inorganic materials, such as oxides. Notably, the bond material powder can include a frit material that is suitable for forming the vitrified final-formed bond material. A frit material can include a powder material formed form a glass, which is formed by firing initially to an elevated temperature (e.g., 1000° C. or greater), cooling, crushing and sizing to yield a powdered material ("a frit"). The frit then may be melted at a temperature well below the initial firing temperature used to make the glass from the raw materials, such as silica and clays.

The following paragraphs denote certain contents and certain compositions which may be used in the bond material powder. It will be appreciated that reference herein to the particular amounts of certain compositions in forming the mixture may not necessarily form a final bond composition in the final-formed abrasive article having the exact same content of each of the species noted. That is, during the forming process, the content of certain species can change such that the final-formed bonded abrasive may not necessarily contain the same amounts of certain species as was initially included in the bond material powder of the initial mixture.

Embodiments herein can utilize a bond material powder having a frit material. Frit material may be formed from oxides such as silica, alkaline oxide compounds, alkaline earth oxide compounds, and a combination thereof. The frit material facilitates suitable forming of a vitrified bond material in the final-formed bonded abrasive. According to one embodiment, the bond material powder can include a certain content of silica ($SiO_2$). For example, embodiments herein may utilize a bond material powder formed from at least about 50 mol % silica. In other embodiments, the amount of silica can be greater, such as at least about 55 mol %, such as at least about 56 mol %, and particularly within a range between about 55 and about 70 mol % silica.

Additionally, the bond material powder can include a certain content of alkali oxide compounds, and particularly a low content of such alkali oxides, which may be more prevalent in low-temperature bond compositions Alkali oxide compounds are oxide compounds and complexes utilizing alkali species denoted as Group 1A elements in the Periodic Table, such as lithium oxide ($Li_2O$), potassium oxide ($K_2O$), sodium oxide ($Na_2O$), and a combination thereof.

In accordance with one embodiment, the bond material powder can be formed from not greater than about 14 mol % total alkaline oxide compounds. In other instances, the bond material powder is formed from less alkaline oxide compounds, such as on the order of not greater than about 13 mol %, not greater than about 12.8 mol %, not greater than about 12.6 mol %, not greater than about 12.4 mol %, not greater than about 12 mol %, or even not greater than about 11 mol %. Particular embodiments herein may form a bond material powder having a total content of alkaline oxide compounds within a range between about 5 mol % and about 14 mol %, such as between about 8 mol % and about 13 mol %, between about 9 mol % and about 12.8 mol %, or even between about 9 mol % and about 12 mol %.

In particular reference to lithium oxide, the bond material powder can contain a particularly low content of lithium oxide, which may be more prevalent in certain low-temperature bond compositions. For example, in embodiments herein, the bond material powder can be formed from less than 2.0 mol % lithium oxide. In other instances, the content of lithium oxide may be less, such as on the order of less than about 1.5 mol %, such as less than 1.0 mol %, such as less than 0.5 mol %. In one particular instance, the bond material powder is formed such that it is essentially free of lithium oxide.

The bond material powder can be formed from a particular content of sodium oxide. For example, embodiments herein may utilize between about 2.0 mol % and about 8.0 mol %, such as between about 3.0 mol % and about 7.0 mol %.

Additionally, embodiments herein may utilize a particular content of potassium oxide, such as within a range between about 2.0 mol % and about 8.0 mol %, such as between about 3.0 mol % and about 8.0 mol %.

The bond material powder can be formed from a certain content of alkaline earth oxide compounds Alkaline earth oxide compounds are oxide compounds and complexes incorporating divalent species from the alkaline earth elements present in Group 2A of the Periodic Table of Elements. That is, for example, certain suitable alkaline earth oxide compounds can include magnesium oxide (MgO), calcium oxide (CaO), strontium oxide (SrO), barium oxide (BaO), and a combination thereof. In accordance with one embodiment, the bond material powder used can be formed from not greater than about 10 mol % total alkaline earth oxide compounds. In other instances, the content of alkaline earth oxide compounds is less, such as on the order of not greater than about 9.0 mol %, not greater than about 8.0 mol %, or even not greater than about 7.0 mol %. Particular embodiments herein may utilize a total content of alkaline earth oxide compounds within a range between about 2.0 mol % and about 10 mol %, such as between about 4.0 mol % and about 9.0 mol %.

Of the alkaline earth oxide compounds, magnesium oxide may be present in the greatest content as compared to the other alkaline earth oxide compounds within the bond material powder. For example, the bond material powder can be formed from at least about 2.0 mol %, such as at least 3.0 mol % magnesium oxide. In certain mixtures, the bond material powder can contain between about 3.0 mol % and 7.0 mol %, and more particularly within a range between about 3.0 mol % and 6.0 mol % of magnesium oxide.

The bond material powder can include a certain content of calcium oxide. For example, embodiments herein may utilize a bond material powder formed from at least about 0.5 mol % calcium oxide, such as within a range between about 0.5 mol % and 3.0 mol % calcium oxide.

The bond material powder may contain a certain content of barium oxide. However, the amount of barium oxide can be less than the amount of magnesium oxide and/or calcium oxide. Generally, the bond material powder contains less than about 2 mol %, such as less than about 1 mol % barium oxide.

According to embodiments herein, the bond material powder can be formed to have a particular content of alumina ($Al_2O_3$). For example, embodiments herein may utilize a bond material powder formed from less than about 13 mol % alumina, such as less than about 12 mol % alumina, or even less than about 11 mol % alumina. Still, certain mixtures can utilize a bond material powder formed from a content of alumina within a range between about 8.0 mol % and about 13 mol %, such as between about 8.0 mol % and about 12 mol %.

In addition to the oxide species noted above, the bond material powder can be formed to have a particular content of phosphorous oxide ($P_2O_5$), which may be a particularly small amount compared to certain low-temperature bond compositions. For example, the bond material powder can be formed from less than 1.0 mol % phosphorous oxide. In other embodiments, the bond material powder can be formed from less than about 0.5 mol % phosphorous oxide. In particular instances, the bond material powder can be formed such that it is essentially free of phosphorous oxide.

Additionally, the bond material powder can be formed form particular contents of boron oxide ($B_2O_3$), which may be lower than certain low-temperature bond compositions. For example, the bond material powder may contain less than 10 mol % boron oxide. In other instances, the bond material powder can be formed from less than about 9.0 mol %, or even less than 8.0 mol % boron oxide. Particular embodiments may utilize a bond material powder formed from between about 5.0 mol % and about 10 mol %, such as between about 5.0 mol % and 9.0 mol % boron oxide.

The bond material powder can include other materials, such as certain other metal oxide compounds or complexes. Suitable additional metal oxide compounds or complexes may include oxides of certain metal elements, such as transition metal species. Such metal oxide compounds or complexes can include iron oxide, titanium oxide, zirconium oxide, zinc oxide, manganese oxide, cobalt oxide, chromium oxide, vanadium oxide, bismuth oxide, and a combination thereof. The presence of such additional metal oxide species can be in minor amounts, such that the bond material powder contains less than about 2.0 mol %, and more particularly less than about 1.0 mol % of any one of the individual oxide compounds noted above.

After forming a mixture of abrasive grains in the bond material powder, it will be appreciated, that other materials may be added to the mixture. For example, certain organic compounds may be added to the mixture such as binders and the like to facilitate formation of the article. In accordance with one particular embodiment, the mixture can contain a certain content of polyethylene glycol, animal glue, dextrin, maleic acid, latex, wax emulsion, PVA, CMC, and other organic and/or inorganic binder.

Additionally, other additives may be provided within the mixture to facilitate formation of the final-formed bonded abrasive article. For example, some suitable additives can include pore formers including, but not limited to, hollow glass beads, ground walnut shells, beads of plastic material or organic compounds, foamed glass particles and bubble alumina, elongated grains, fibers and combinations thereof.

After forming the mixture at step 101, the process can continue at step 103 by forming the mixture to form a green article. A green article is reference to an unfinished article which may not be thoroughly heat treated to complete densification (i.e. fully sintered). In accordance with one embodiment, the process of forming the mixture can include a pressing operation wherein the mixture is pressed into a particular shape similar to the shape of the intended final-formed bonded abrasive article. A pressing operation may be conducted as a cold pressing operation. Suitable pressures can be within a range between about 10 and about 300 tons.

After suitably forming the mixture at step 103, the process can continue at step 105 by heating the green article to a firing temperature of at least 1100° C. to form the abrasive article. Firing is generally carried out at a temperature suitable to form a vitrified bond material. The forming processes of the embodiments herein utilize notably high firing temperatures, such as at least about 1100° C. In other instances, the firing temperature can be greater, such as at least about 1150° C., at least 1200° C., at least about 1250° C., or even at least about 1300° C. The firing temperature used to form the bonded abrasive articles of embodiments herein can be within a range between about 1100° C. and about 1400° C., such as between 1100° C. and about 1300° C.

Generally, firing can be carried out in an ambient atmosphere, such that is contains air. Generally, the duration of peak temperature for firing can be at least about 1 hour, and particularly within a range between about 1 to 10 hours. After sufficiently heating the article to form a bonded abrasive article having abrasive grains contained within a vitreous bond material, the article can be cooled. Embodiments herein may utilize a natural cooling process wherein the power to the furnace is turned off and the article is allowed to cool from the firing temperature to room temperature naturally.

As noted above, the bonded abrasive articles of embodiments herein can include abrasive grains contained within a bond material, wherein the bond material is a vitreous material having an amorphous phase. Moreover, the foregoing has noted particular contents of certain compositions (e.g. alkaline oxide compounds, silica, alumina, boron oxide, etc), can change during the high temperature forming process such that the final-formed bonded abrasive article has a different content of such compositions as compared to the content of such compositions within the initial mixture. Accordingly, the bonded abrasive articles of embodiments herein are formed such that the final bond material of the abrasive article has certain contents of certain components and more particularly ratios of certain components such that the bonded abrasive article can be formed at high temperatures without severe degradation and dissolution of the microcrystalline alumina abrasive grains.

In particular, the final bond composition of the abrasive article can have a particular content of alkali oxide compounds. For example, with respect to sodium oxide, the bond material can contain not greater than about 8.0 mol % sodium oxide. In other embodiments, the amount of sodium oxide can be less, such as not greater than about 7.0 mol %, or even not greater than about 6.0 mol %. In particular instances, the bond material can contain between about 2.0 mol % and about 8.0 mol %, and more particularly between about 3.0 mol % and about 6.0 mol % sodium oxide.

With respect to potassium oxide, the bond material can contain at least about 4.0 mol % potassium oxide. In other instances, the bond material can contain at least about 5.0 mol % potassium oxide. In certain embodiments, the final bond material of the abrasive article can have between about 4.0 mol % and about 10 mol %, and particularly between about 4.0 mol % and about 8.0 mol % potassium oxide.

Moreover, the final bond material of the abrasive article can be formed such that it has a particular ratio between the content of potassium oxide and content of sodium oxide. For example, the ratio of potassium oxide to sodium oxide in mol % and expressed as [$K_2O/Na_2O$] can have a value that is greater than about 0.5. In other embodiments, the ratio can be greater than about 0.75, such as greater than about 0.9, or even greater than 1.0. Notably, the composition of the final bond material can utilize a ratio between potassium oxide and sodium oxide [$K_2O/Na_2O$] that is within a range between about 0.5 and about 2.2, such as between about 0.75 and about 2.0, between about 0.8 and 1.9, or even between about 1.0 and about 1.4.

As noted above, the initial mixture of the bond material can contain particularly low amounts of certain alkali oxide compounds such as lithium oxide. As such, the final-formed bond material of the abrasive article can generally have less than about 2.0 mol % lithium oxide, such as less than 1.5 mol %, such as less than 1.0 mol %, or even less than 0.5 mol % lithium oxide. Notably, in particular embodiments the final-formed bond material of the abrasive article can be essentially free of lithium oxide.

The abrasive articles of embodiments herein can have a total content of alkali oxide compounds that are significantly lower than other conventional bond materials, which facilitates a bonded abrasive article formed at high temperatures employing MCA grains with high integrity. That is, the total amount of alkali oxide compounds within the final bond material can be less than about 13 mol %. In particular, the total content of alkali oxide compounds can be less than about 12.8 mol %, less than about 12.6 mol %, less than about 12.4 mol % or even less than about 11.5 mol % for the total mols of material within the bond material. In certain instances, the abrasive articles herein are formed such that the final bond material has a total content of alkali oxide compounds that are less than 13 mol % and greater than about 8.0 mol %, such as less than about 12.8 mol % and greater than about 9.0 mol %, or less than about 12 mol % and greater than about 8 mol %, or less than about 11.5 mol % and about 9.0 mol %, and more particularly, less than about 11.5 mol % and greater than about 9.5 mol %.

The abrasive articles of embodiments herein can have a particular content of phosphorous oxide. For example, the final-formed bond material can have less than about 1.0 mol % of phosphorous oxide, such as less than about 0.5 mol % phosphorous oxide. In particular, the final-formed bond material of the abrasive article can be essentially free of phosphorous oxide.

The final-formed bond of the abrasive articles of embodiments herein can have a particular content of boron oxide. For example, the final-formed bond material can have less than 10 mol % boron oxide. In other instances, the final-formed bond material can contain less than about 9.0 mol %, such as less than 8.0 mol % boron oxide. In certain embodiments, the final-formed bond material has a content of boron oxide within a range between about 1.0 mol % and about 10 mol %, such as between about 2.0 mol % and about 9.0 mol %, or even between about 2.0 mol % and about 8.0 mol %.

In addition to the total content of boron oxide contained within the final-formed bond material, embodiments herein may utilize a particular ratio between the content of boron oxide and other alkali oxide compositions or even between the total content of boron oxide and total content of alkali oxide compounds.

As will be appreciated, the bond material can contain a significant amount of silica. That is, the final-formed bond material can be formed such that it contains a majority amount of silica (i.e. greater than 50 mol % silica). In other embodiments, the final-formed bond material can contain greater than about 55 mol % silica, in particularly within a range between about 55 mol % and about 70 mol %, and more particularly between about 55 mol % and about 65 mol % silica.

Additionally, the final-formed bond material can exhibit a particular ratio between the content of silica and total content of alkali oxide compounds ($C_{aoc}$) measured in mol % and expressed as [$C_{aoc}/SiO_2$] and having a value greater than about 0.17. In other embodiments, the ratio [$C_{aoc}/SiO_2$] can be greater than about 0.18, such as between about 0.17 and 0.6, and particularly within a range between about 0.18 and about 0.5.

The final-formed bond material can exhibit certain contents of alumina ($Al_2O_3$) suitable for forming the high-temperature bonded abrasive article. For example, the final bond material can contain at least about 12 mol % alumina, such as at least about 13 mol % alumina, or even at least about 14 mol % alumina. Still, the total content of alumina within the final bond may be limited, such as not greater than about 18 mol %, not greater than about 17 mol % or even not greater than about 16 mol %. As will be appreciated, the amount of alumina may be controlled in comparison to the total content of other species (i.e., oxide compounds) within the bond material, including, but not limited to, silica, alkali oxides, alkaline earth oxides, borides, and a combination thereof.

Additionally, the final-formed bond material may contain a certain content of alkaline earth oxide compounds ($C_{aeoc}$). Suitable alkaline earth oxide compounds can include magnesium oxide, calcium oxide, strontium oxide, and barium oxide. In particular instances, the abrasive article can be formed such that the final bond material can contain not greater than about 6.0 mol %, such as not greater than about 5.0 mol %, or even, not greater than about 4.0 mol % magnesium oxide. In certain embodiments, the final-formed bond material contains between about 1.0 mol % and about 6.0 mol %, such as between about 1.0 mol % and about 4.0 mol % magnesium oxide.

Additionally, the final-formed bond material can contain a specific content of calcium oxide, particularly an amount that is less than the content of magnesium oxide. For example, the final-formed bond material can contain less than about 6.0 mol % calcium oxide, such as less than about 4.0 mol % calcium oxide, or even less than about 3.0 mol % calcium oxide. In certain embodiments, the final-formed bond material can contain between about 1.0 mol % and about 5.0 mol %, such as between about 1.0 mol % and about 3.0 mol % calcium oxide.

Moreover, the final-formed bond material can contain an amount of barium oxide of less than about 2.0 mol %, such as less than about 1.0 mol %, and particularly within a range between about 0.1 and about 1.0 mol %.

The total content of alkaline earth oxide compounds ($C_{aeoc}$) can be at least about 1.0 mol %, such as at least about 2.0 mol %, or even at least about 3.0 mol %. Still, embodiments herein may utilize a final-formed bond material that has a total content of alkaline earth oxides that is less than about 9.0 mol %, such as less than about 8.0 mol %, or even less than about 7.0 mol %. That is, the final-formed bond material of abrasive articles according to embodiments herein can have a total content of alkaline earth oxides within a range between about 2.0 mol % and about 9.0 mol %, such as within a range between about 3.0 mol % and about 7.0 mol %.

In addition to the total content of alkaline earth oxide compounds, the bond material may utilize a particular ratio between the total content of alkali oxide compounds and alkaline earth oxide compounds. The ratio between the total content of alkali oxide compounds (in mol %) as compared to the total content of divalent alkaline earth compounds (in mol %) can be a ratio expressed as [$C_{aoc}/C_{aeoc}$] having a value of at least about 1.2. In other embodiments, this ratio can be at least about 1.5, such as at least about 1.75, at least 2.0. Still, the ratio can be generally less than about 3.5, such as less than 3.25, and less than 3.0. Certain embodiments utilize a bond material having a ratio [$C_{aoc}/C_{aeoc}$] between the alkali oxide compounds and divalent alkaline earth compounds that is within a range between about 1.2 and about 3.5, such as between about 1.5 and about 3.25, such as between about 1.75 and about 3.0, and particularly within a range between about 2.0 and about 2.75.

The compositions of the abrasive tools of the invention preferably contain a total abrasive grain content from about 34 vol % to about 56 vol %, such as between about 40 vol % and about 54 vol %, and particularly between about 44 vol % and about 52 vol %. The MCA abrasive can account for between about 1 to about 100 vol % of the total abrasive grain of the abrasive article, such as between about 10 vol % and about 80 vol %, or between 30 vol % and about 70 vol % of the total volume of abrasive grain in the abrasive article.

The abrasive articles of the embodiments herein can include between about 3.0 and about 30 vol % bond material. In more particular instances, the abrasive article can contain between about 3 vol % to about 25 vol % bond, between about 4 vol % to about 20 vol % bond, and even between about 5 vol % to about 18.5 vol % bond. Moreover, some abrasive articles can include 0.1 vol % to 60 vol % of one or more secondary abrasive grains, fillers and/or additives.

While a majority of the abrasive tools can have various degrees of porosity, however, some of the abrasive bodies formed according to embodiments contained herein may exhibit a certain content of porosity. For example, the abrasive body can have a porosity that is less than about 50 vol % of the total volume of the abrasive body. In other instances, the porosity can be less than about 49 vol %, such as less than about 40 vol %. In particular instances, certain abrasive bodies can be formed to have a porosity that is at least about 20 vol % and less than about 40 vol %, such as at least about 30 vol % and less than about 50 vol %, and more particularly between about 30 vol % and about 49 vol %.

The abrasive articles described herein can be formed through a high-temperature forming process without particular dissolution or degradation of the abrasive grains comprising the microcrystalline alumina. In particular, the abrasive bodies formed according to the processes herein can exhibit a particular hardness as measured in a sandblast penetration test under the following conditions. Sandblast tests were conducted by first calibrating a standard, such as a glass plate material, on a table under a measuring rod and the standard was placed in contact with a surface of the blast seal. An air pressure of 15 psi, in a chamber having a volume of 48 cc was used to blast standard grade sand material at the surface of the standard (or samples) for a single cycle time of 10 seconds. The depth of the hole formed in the standard after a single cycle was measured and recorded. Upon confirming the depth of the hole formed in the standard was within the appropriate range, samples formed according to embodiments herein were tested. As will be appreciated, the lower the value of the depth, the harder the abrasive article.

Certain abrasive articles of embodiments herein demonstrate a sandblast penetration of not greater than about 2.2 mm. In fact, certain abrasive bodies exhibit a sandblast penetration of not greater than about 2.1 mm, such as not greater than about 2.0 mm, not greater than about 1.9 mm, not greater than about 1.8 mm, and even not greater than about 1.6 mm.

EXAMPLE

Two samples were prepared, a sample S1 formed according to embodiments herein and a second, conventional sample CS1 having a conventional bond material. The samples S1 and CS1 were tested under particular grinding conditions to compare their performance properties.

The S1 sample was formed by initially combining 80-90 wt % of abrasive grains with 9-15 wt % of an initial bond material having the composition provided in Table 1 below. The mixture further included a remainder amount (wt %) of other additives including a binder material. Sample 1 was initially cold pressed to form a green article, and thereafter sintered at a firing temperature of about 1200° C. to form a final abrasive article having approximately 46-50 vol % abrasive grains, 7-11 vol % bond material, and a reminder amount of porosity. The final composition of the bond material is provided in Table 1.

TABLE 1

| Component | S1 Initial Composition (mol %) | S1 Final Composition (mol %) |
|---|---|---|
| SiO2 | 60.73 | 58.92 |
| Al2O3 | 10.75 | 16.44 |
| B2O3 | 7.97 | 7.45 |
| Li2O | 0 | 0 |
| Na2O | 5.7 | 5.35 |
| K2O | 6.72 | 5.77 |
| MgO | 5.15 | 2.96 |
| CaO | 1.66 | 1.88 |
| BaO | 0.36 | 0.37 |
| Fe2O3 | 0.18 | 0.1 |
| TiO2 | 0.63 | 0.47 |
| ZrO2 | 0.03 | 0.27 |
| ZnO | 0.12 | 0.02 |

The sample CS1 is formed according to the process of sample S1 having an initial and final bond compositions as described herein. The CS1 sample was fired at a firing temperature between about 900° C.-950° C. Like sample S1, the sample CS1 was formed such that it also contained approximately 46-50 vol % abrasive grains, 7-11 vol % bond material, and a reminder amount of porosity.

The total alkali oxide compound content of the final-formed vitreous bond for the CS1 sample was approximately 16-18 mol % including significant contents of lithium oxide, the total content of alkaline earth oxide compounds was approximately less than 1.5 mol %, the total boron oxide content was greater than 10 mol % and calculated to be between about 14 and 18 mol %, the ratio between potassium oxide and calcium oxide [$K_2O/Na_2O$] was between 0.01 and 0.05.

The samples S1 and CS1 were subject to an outer diameter (OD) plunge grinding test to determine the power consumption of the bonded abrasive articles and also the final surface roughness of the test workpiece after the grinding procedure. The OD plunge grinding conditions were conducted under a controlled feed grinding condition using coolant, the conditions of which are summarized in Table 2 below.

TABLE 2

| Parameter | Values |
|---|---|
| Workmaterial type | 100Cr6 |
| Wheel speed (m/sec) | 35 |
| Table speed (mm/min) | 200-1000 |
| Depth of cut (mm) | 1 |
| Theoretical Material Removal Rate MRR ($mm^3$/sec/mm) | 3.3, 6.7, 10, 13.3, 16.7 |
| Grind Width (mm) | 10 |
| Dressing Feed (mm/min) | 835 |
| Total dress amount (m) | 200 |

Table 3 below summaries the average power consumed during the grinding process for a given number of dressing cycles, and the roundness deviation of the workpiece after testing. As illustrated by the data, sample S1 demonstrated improved (i.e., lower) average power consumption over the conventional sample, CS1, for a greater number of dressing cycles. Moreover, the roundness deviation of the workpieces ground by the S1 samples were half of the roundness deviation of the samples ground using the CS1 bonded abrasive.

TABLE 3

| Sample | Average Power (mW) | Dressing Cycles (No. of workpieces) | Roundness Deviation (microns) |
|---|---|---|---|
| CS1 | 5.8 | 10 | 20 |
| S1 | 4.9 | 15 | 10 |

A second set of grinding tests were carried out using the samples S1 and CS1. Traverse surface grinding tests were conducted using the samples S1 and CS1 using a coolant under conditions summarized in Table 4 below.

TABLE 4

| Parameter | Values |
|---|---|
| Workmaterial type | 100Cr6 |
| Wheel speed (m/sec) | 35 |
| Table speed (mm/min) | 200-1000 |
| Depth of cut (mm) | 1 |
| Theoretical Material Removal Rate MRR ($mm^3$/sec/mm) | 3.3, 6.7, 10, 13.3, 16.7 |
| Grind Width (mm) | 10 |
| Dressing Feed (mm/min) | 835 |
| Total dress amount (m) | 200 |

Figure 2:
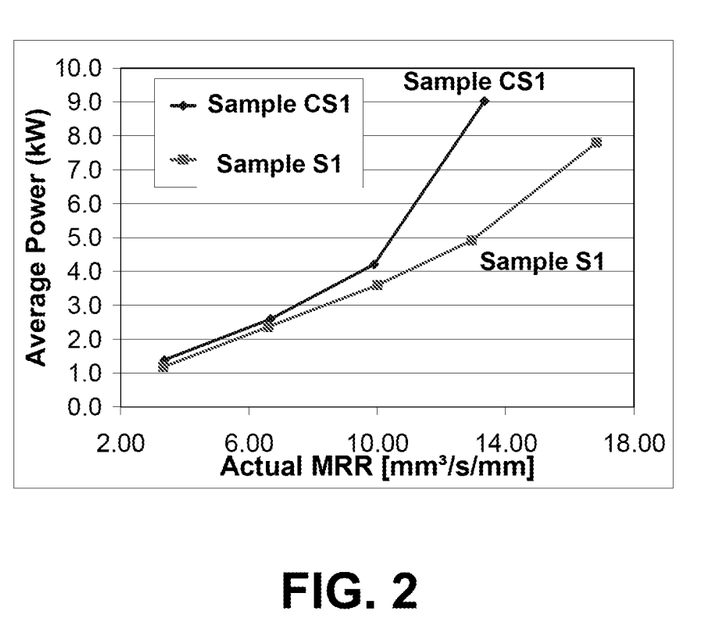
FIG. 2 includes a plot of average power consumption versus material removal rate for a sample formed according to an embodiment and a conventional bonded abrasive sample.
Figure 3:
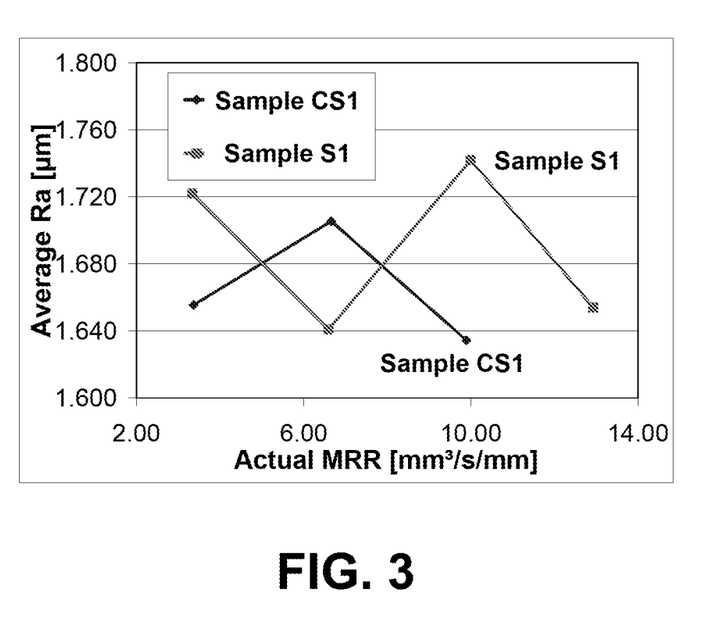
FIG. 3 includes a plot of average surface roughness (Ra) versus material removal rate for a sample formed according to an embodiment and a conventional bonded abrasive sample.

The results of the testing are provided in plots of FIGS. 2 and 3. FIG. 2 includes a plot of average power versus material removal rate (MMR) for the samples S1 and CS1. As indicated, the sample S1 demonstrated a lower average power consumption over the range of tested material removal rates on the workpiece as compared to the sample CS1. In particular, at higher material removal rates exceeding 10 $mm^3$/s/mm the difference between the average power consumption of the sample CS1 and S1 was significant.

FIG. 3 is a plot of average surface roughness (Ra) of the workpiece as measured in microns versus the material removal rate for the samples S1 and CS1. As illustrated in FIG. 3, generally the surface roughness of the workpiece after the grinding tests was approximately the same for both samples. Notably, sample S1 was capable of providing nearly the same surface roughness at high material removal rates as well as low material removal rates.

Notably, the combined information of FIGS. 2 and 3 indicates that the bonded abrasive article formed according to embodiments herein (Sample S1) can use less power even while utilizing increased material removal rates over a conventional sample. And additionally, even at higher material removal rates, the finish of the workpiece is not compromised. In fact, during testing, the workpieces ground using the sample CS1 were burned, while the finish of the workpieces ground using the sample S1 were not observed to be burned.

The embodiments herein are directed to abrasive articles incorporating microcrystalline alumina grains in a high temperature bonded abrasive article, wherein the microcrystalline alumina grains exhibit improved integrity and minimized dissolution and degradation. State-of-the-art bonded abrasive articles employing MCA grains have been directed to the formation and use of low temperature vitrified bonds formed at temperatures below 1000° C. However, the embodiments herein are directed to a bonded abrasive article formed at high temperatures and use of a bond material that facilitates high-temperature forming processes while minimizing dissolution and degradation of the MCA grains. The embodiments herein notably utilize one or more combination of features, including total contents of alkali oxide compounds, alkali earth oxide compounds, boron oxide, silica, alumina, phosphorous oxide, and lithium oxide, particular ratios of alkali oxide compounds, alkali earth oxide compounds, boron oxide, silica, alumina, phosphorous oxide and lithium oxide as compared to each other, and particular contents of abrasive grains, bond, and porosity that facilitate the formation of a bonded abrasive article having improved characteristics, such as hardness and grinding performance. The foregoing describes a combination of features, which can be combined in various manners to describe and define the bonded abrasive articles of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A method of forming an abrasive article comprising:
mixing abrasive grains comprising microcrystalline alumina with a bond material powder, wherein the bond material powder comprises not greater than about 15 wt % alkali oxide compounds;
forming the mixture into a green article; and
heating the green article to a firing temperature of at least about 1150° C. to form an abrasive article having abrasive grains contained within a vitreous bond material.

2. The method of claim 1, wherein the bond material powder comprises a frit.

3. The method of claim 1, wherein the bond material powder comprises at least about 50 wt % silica.

4. The method of claim 3, wherein the bond material powder comprises between about 50 wt % and about 70 wt % silica.

5. The method of claim 1, wherein the bond material powder comprises alkali oxide compounds selected from the group of compounds consisting of potassium oxide ($K_2O$), sodium oxide ($Na_2O$), lithium oxide ($Li_2O$) and a combination thereof.

6. The method of claim 5, wherein the bond material powder comprises less than about 2.0 mol % lithium oxide.

7. The method of claim 6, wherein the bond material powder is free of lithium oxide.

8. The method of claim 1, wherein the bond material powder comprises less than about 1.0 mol % phosphorous oxide ($P_2O_5$).

9. The method of claim 8, wherein the bond material powder is free of phosphorous oxide ($P_2O_5$).

10. The method of claim 1, wherein forming comprises pressing the mixture into a shape.

11. The method of claim 1, wherein the firing temperature is at least about 1200° C.

12. The method of claim 1, wherein the firing temperature is at least about 1250° C.

13. A method of forming an abrasive article comprising:
mixing abrasive grains comprising microcrystalline alumina with a bond material powder, wherein the bond material powder comprises not greater than about 15 wt % alkali oxide compounds;
forming the mixture into a green article; and
heating the green article to a firing temperature within a range of more than 1100° C. to about 1400° C. to form an abrasive article having abrasive grains contained within a vitreous bond material.

14. The method of claim 13, wherein the firing temperature is within a range of more than 1100° C. to about 1300° C.

15. The method of claim 1, wherein the bond material powder comprises not greater than about 18 mol % alumina ($Al_2O_3$).

16. The method of claim 1, wherein the bond material powder comprises not greater than about 10 mol % of a total content of divalent alkaline earth oxide compounds.

17. The method of claim 13, wherein the bond material powder comprises a frit.

18. The method of claim 13, wherein the bond material powder comprises at least about 50 wt % silica.

19. The method of claim 13, wherein the bond material powder comprises alkali oxide compounds selected from the group of compounds consisting of potassium oxide ($K_2O$), sodium oxide ($Na_2O$), lithium oxide ($Li_2O$) and a combination thereof.

* * * * *